Oct. 13, 1959 R. J. HARKENRIDER 2,908,037
MAKING MULTIPLE TUBE STRUCTURES BY EXTRUSION
Filed March 24, 1954 4 Sheets-Sheet 1
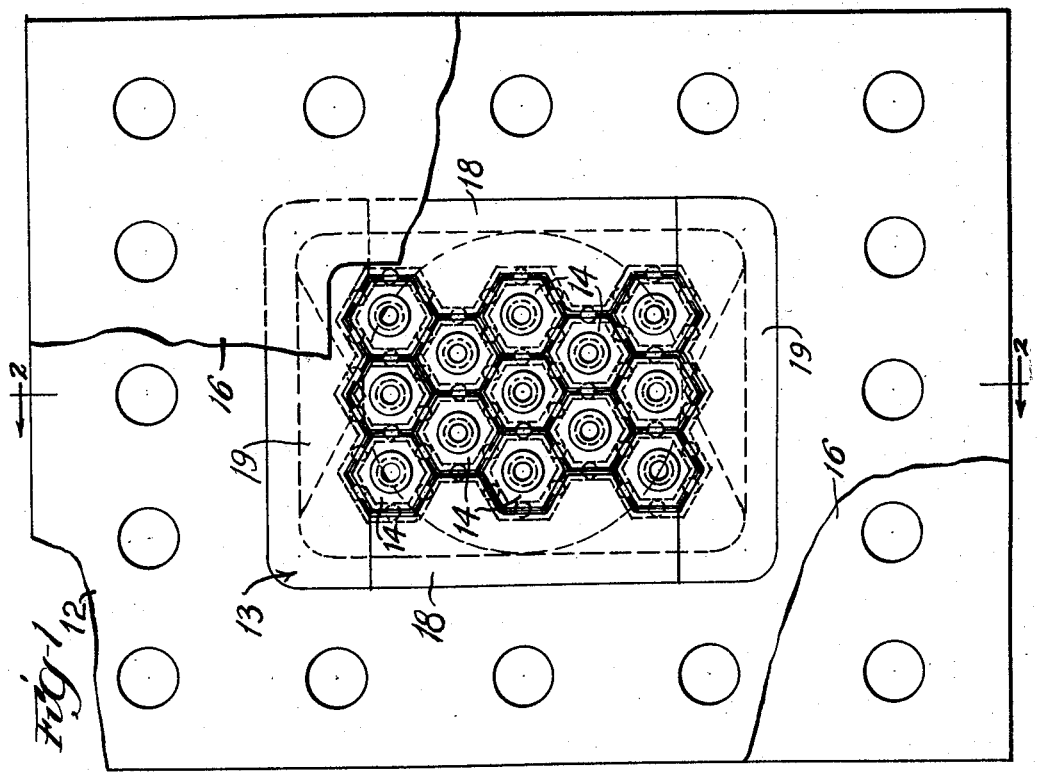
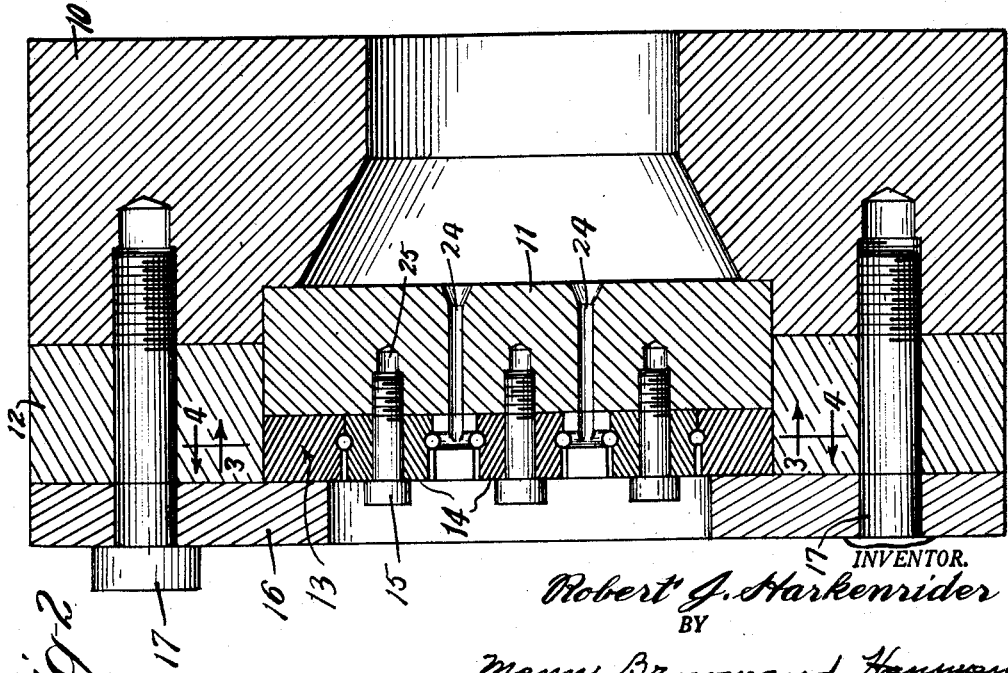
INVENTOR.
Robert J. Harkenrider
BY
Mann, Brown and Hansmann
Attys.

Oct. 13, 1959    R. J. HARKENRIDER    2,908,037
MAKING MULTIPLE TUBE STRUCTURES BY EXTRUSION
Filed March 24, 1954    4 Sheets-Sheet 2
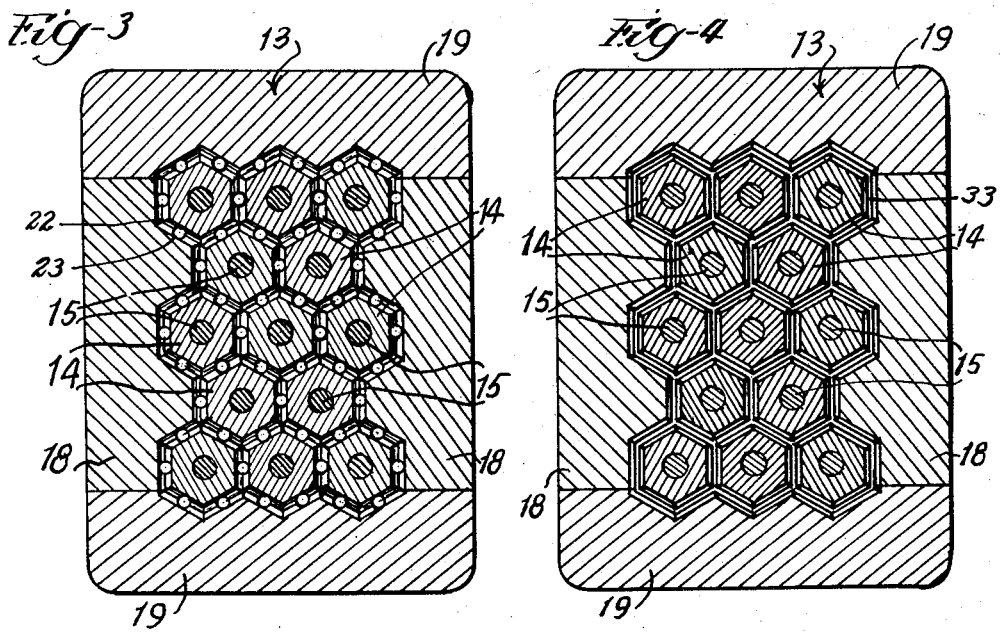
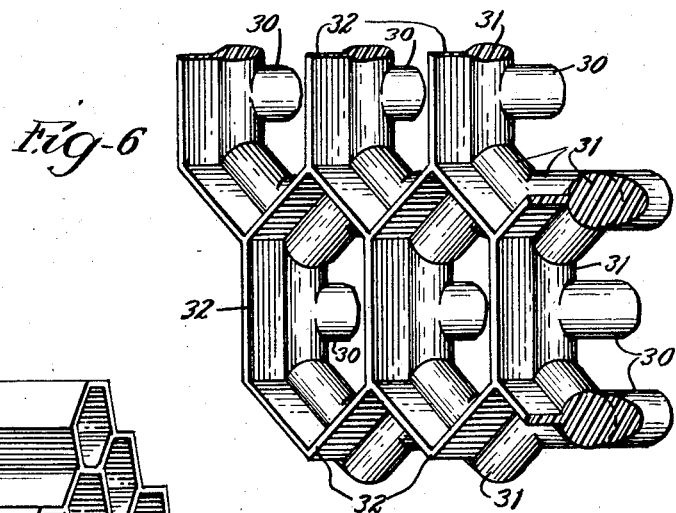
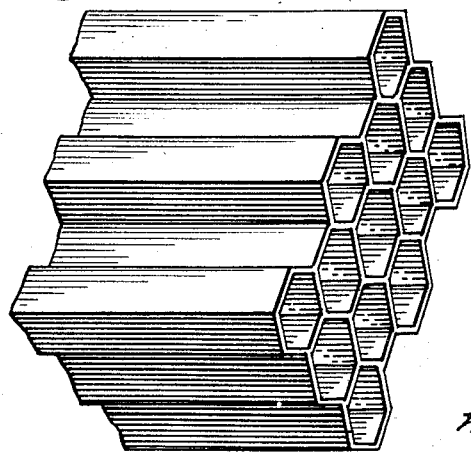
INVENTOR.
Robert J. Harkenrider
BY
Mann, Brown and Hansmann
Attys.

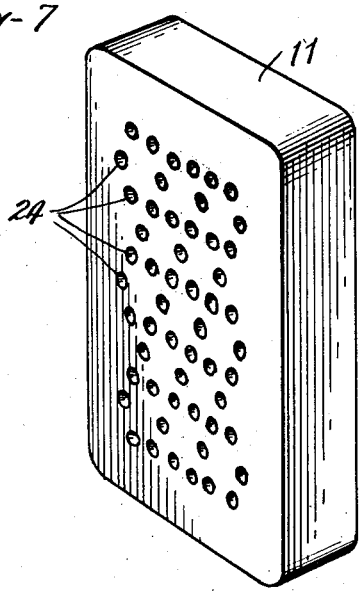
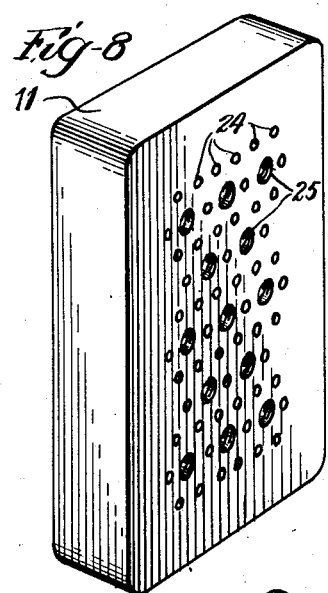
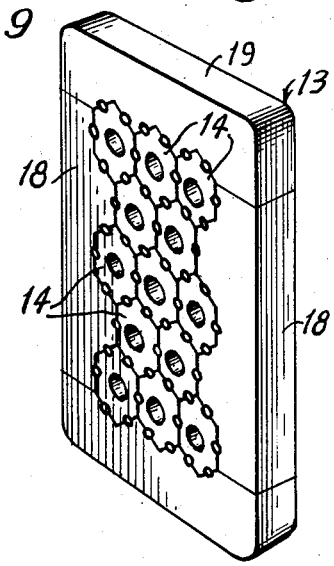
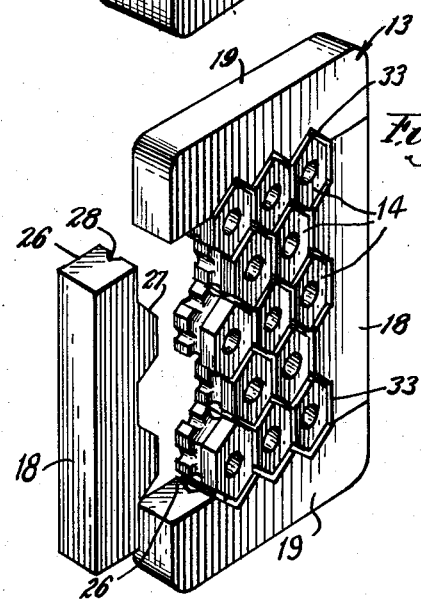
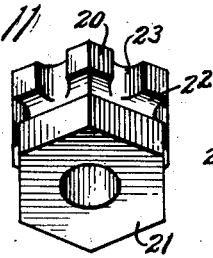
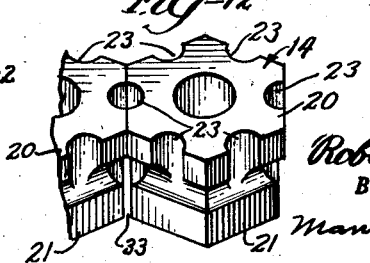

Oct. 13, 1959 R. J. HARKENRIDER 2,908,037
MAKING MULTIPLE TUBE STRUCTURES BY EXTRUSION
Filed March 24, 1954 4 Sheets-Sheet 4
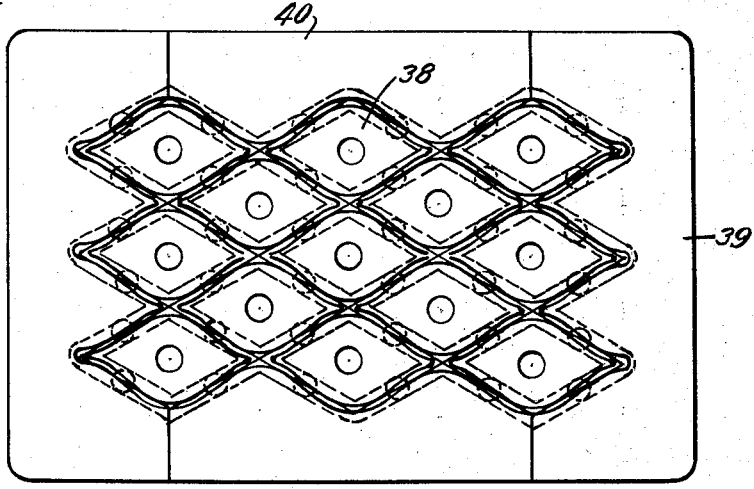
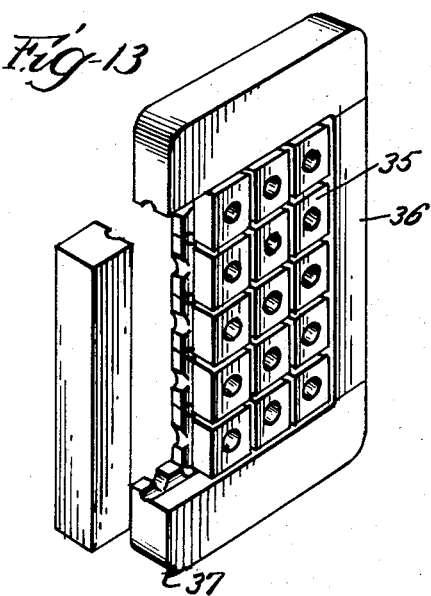
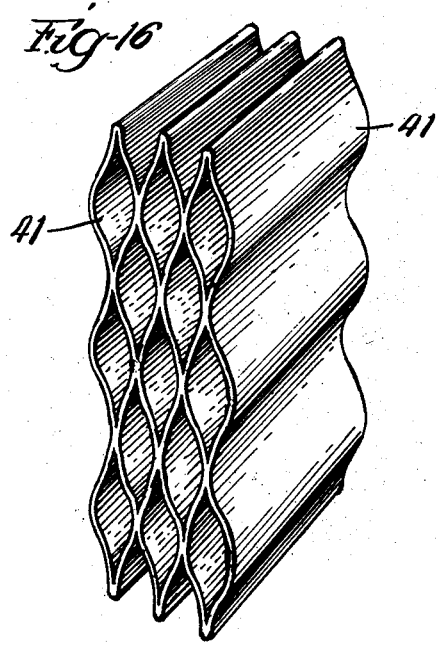
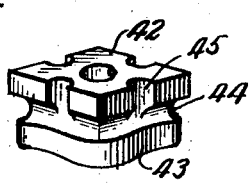
INVENTOR.
Robert J. Harkenrider
BY
Mann, Brown and Hansmann United States Patent Office 2,908,037
Patented Oct. 13, 1959

2,908,037

MAKING MULTIPLE TUBE STRUCTURES BY EXTRUSION

Robert J. Harkenrider, Winona, Minn., assignor, by direct and mesne assignments, to Multiple Extrusions, Inc., Winona, Minn., a corporation of Minnesota Application March 24, 1954, Serial No. 418,442

8 Claims. (Cl. 18—12)

This invention relates to making a multiple tube structure with walls of generally polygonal arrangement integrally formed at corners of common walls.

Generally speaking, this is accomplished by a process which includes forcing fluent material simultaneously through a plurality of feed passages into a group of relatively large, looped distributing passages interconnected throughout the group, and from thence through a continuous extruding passage made up of like generally polygonal passages having common side portions connected at the corners with adjoining side portions throughout.

Preferably, the process is carried out with an extruding die having a group of generally polygonal tube forming passages continuous with each other about aligned and like generally polygonal cores having common sides and connected at the corners of the common sides into continuous passages throughout the group, said continuous passages connected to relatively large feeder passages surrounding the cores and continuous with each other, and delivering uniformly to connected tube forming passages.

Preferably, the die is composed of a group of cores of generally polygonal form and cross section, each including a relatively large base portion and a relatively small head portion with a groove about the waist between the base and head portions together with marginal pieces framing the group of cores and having generally semi-polygonal recesses with base and head faces separated by grooves, all corresponding to the base and head portions of the cores and grooves between them, the cores and marginal pieces being held together by fastenings that promote easy assembly and ready taking apart for cleaning and service.

Further objects and advantages will be apparent as the description is read in connection with the drawings, in which:

Fig. 1 is a front or delivery face view of the extrusion die, bolts being omitted and portions of the retainer plate being broken away;

Fig. 2 is a section on the line 2—2 of Fig. 1;

Figs. 3 and 4 are sections on the line 3—3 and 4—4 of Fig. 2 looking in the directions indicated by the arrows;

Fig. 5 is a perspective view of the multiple tube structure extruded from the die;

Fig. 6 is a perspective view of the fluent material as it passes through the die but with all portions of the die removed;

Figs. 7 and 8 are perspective views of the screen plate, Fig. 7 showing the back or receiving side prominently and Fig. 8 the front or delivery side prominently;

Fig. 9 is a perspective view of a group of cores and marginal pieces forming part of the die showing the base or receiving side prominently;

Fig. 10 is a similar perspective view showing the front side prominently with one of the marginal pieces displaced;

Fig. 11 is a perspective view of one of the cores showing the front or delivery side prominently;

Fig. 12 is a similar perspective view of two of the cores showing the base side prominently;

Fig. 13 is a perspective view similar to Fig. 10 showing an alternative with cores generally square in cross section;

Fig. 14 is a plan view of another alternative form in which the heads of the cores are modified rhomboid;

Fig. 15 is a perspective view of one of the individual cores from Fig. 14; and

Fig. 16 is a perspective view of a multiple tube structure made with the die shown in Fig. 14.

But these drawings and the corresponding description are for the purpose of illustrative disclosure, and are not intended to impose unnecessary limitations on the claims.

Of the several generally polygonal forms which lend themselves to the application of the invention, the equilateral hexagon is chosen for this preferred embodiment, and lends itself readily to the construction of the cores and marginal pieces, together making up the die including the appropriate inlet passages supplying the relatively large, continuous, looped storage and supply passages for the relatively thin tube forming passages to the end that the appropriate supply of fluent material is stored or pooled back of the continuous, generally polygonal tube forming passages, and from which storage or pool, where the material is continuously united, it is forced through the final extruding passages as a final continuous product unitary in all respects.

The die includes a body comprising a base plate 10 (Fig. 2) adapted to be secured to the extruding or pressure machine, a screen plate 11 fitted into the base plate, a mounting plate 12, a marginal plate 13 framing and surrounding a plurality of cores 14 secured to the screen plate by bolts 15, and a retainer plate 16 made fast by bolts 17 passing through it and the mounting plate and into the base plate 10.

In this illustrative embodiment, there are thirteen cores 14 nested in a group surrounded and framed by the marginal plate 13 composed of four pieces, two of which marked 18 may be termed sides and two of which marked 19 may be termed ends.

Each core 14 is made from hexagonal stock and has a relatively large base portion 20 (see Figures 11 and 12), a relatively small head portion 21 separated from the base portion by a waist groove or passage forming what may be called a waist portion 22. The base portion 20 is provided in each hexagonal face with a feed groove 23 positioned to receive fluent material from a passage 24 (Fig. 2) in the screen plate and deliver it to the waist groove 22, which in turn delivers it to the space between the relatively small heads.

In Fig. 7, it will be seen that the screen plate has a group of six passages 24 for each core 14.

In Fig. 8, it will be seen that the screen plate also has a threaded hole 25 for each core 14 adapted to receive the corresponding fastening bolt 15.

Looking at Figs. 3, 4, 9, and 10, it will be seen that the four pieces 18 and 19 have complementary faces or corners receiving the outer ones of the group of cores and having base portions 26, head portions 27, and waist grooves 28 corresponding to the relatively large base portions 20, the relatively small head portions 21, and the waist grooves 22 of the cores.

Looking at Fig. 9, it will be seen that the base portions of the thirteen cores and four marginal pieces nest together closely and mutually register and locate the cores and marginal pieces with the surrounding and extruding passages continuously joined and the walls of the generally polygonal tubes, to be formed, outlined by the spaces between the adjacent head portions of the cores and the marginal pieces, as appears in Fig. 10 indicated by 33.

The section, Fig. 3, shows the six feed passages 23 for each core leading to the six waist grooves 22 (which as a group surround all of the cores) and fill all of the waist spaces between the cores and between the cores and the marginal pieces.

In Fig. 6, 30 indicates the fluent material going through the mating passages 23; 31 indicates the fluent material in complete and continuous storage or pool in the mating waist grooves 22; and 32 indicates the walls of the tubes as they are formed by the fluent material flowing from the pool 31 through the extruding passages 33, which are continuous and formed by the walls of the head portions of the group of cores and the surrounding marginal pieces. It should be noted that the passages 23 and 24 combine to form a single feed passage that, including its inlet and outlet ports, is unidirectional throughout its length, which insures that the fluent flow is only parallel to the direction of flow through the inlet passage of base plate 10; this eliminates restrictions in fluent flow that would result in uncontrollable pressure differentials in the fluent material as it is being defined into the relatively thin wall structures illustrated.

This particular die is made for extruding multiple tube structures with unitary walls of rubber-like material to serve as a spring element, particularly in journal box lubricators. The wall thickness is on the order of .20".

In this die, each core is .500" long with the base .593" hex., the head .562" hex., and the waist grooves are .170" high struck on a radius of 3/32".

It will be apparent that the die can be readily taken apart and put together; that when assembled the natural form of the bases of the cores and marginal pieces insures the proper relationship, and the general binding of the group of cores and marginal pieces is such as to maintain the necessary relation for uniform production of the walls of the cellular or multi-tubular structure.

The use of thirteen cores of generally hexagonal form is merely illustrative, and any suitable number may be successfully used by following the scheme illustrated.

Hexagonal cores or generally hexagonal cores are readily made from commercial bar stock reduced to form the heads, ground on the faces of the bases of the heads, and hardened to insure accuracy and long wear.

Rubber-like compound for this particular purpose may be illustrated by the following formula or recipe:

|  | Parts | Made by— |
| --- | --- | --- |
| Hycar 1042 [1] | 100.0 | B. F. Goodrich Chemical Co. |
| Zinc Oxide (#42 Green Label) | 5.0 | St. Joseph Lead Co. |
| Sulfur (Spider or Blackbird) | 0.5 | C. P. Hall Co. |
| FEF Black (Philblack A) | 100.0 | Phillips Petroleum Co. |
| GP-261 | 10.0 | B. F. Goodrich Chemical Co. |
| TMTD (Methyl Tuads) | 2.0 | R. T. Vanderbilt Co. |
| Santocure | 1.0 | Monsanto Chemical Co. |
| Stearic Acid | 1.0 | Binney & Smith Co. |

[1] Similar synthetic rubber usable for the same or similar purposes may be selected from Materials Handbook, by George S. Brady, McGraw-Hill Book Co., 1944, pp. 520-524.

Hycar 1042 is a copolymer of butadiene and acrylonitrile (medium acrylonitrile type). Philblack A is fast extrusion furnace carbon black. GP-261 is dioctyl phthalate. Methyl Tuads are tetramethyl thiuram disulfide. Santocure is N-cyclohexyl-2-benzothiazole sulfenamide.

When the multi-tube structures according to the invention are to be used for cushions and similar structures not exposed to oil, rubber of the usual composition will be satisfactory.

When the multi-tube structures are for building or insulating, the fluent composition will be selected from the customary asphaltic and bituminous base, gypsum, and other earth.

The hexagonal multiple tube structure illustrated in Fig. 5 is preferred because it presents extraordinary ability to resist pressure and to recover after being relieved, but there are uses in which other shapes will be satisfactory or preferred.

Fig. 13 shows a group of square or generally square cores 35 surrounded by and cooperating with marginal pieces 36 and 37, the assembly corresponding very closely to those shown in Figs. 1–12.

The arrangement of passages for the fluent material, the nesting of the bases, the interlocking of the parts, are deemed to be apparent from the drawing without detailed description.

In Fig. 14, there is shown a group of cores 38 with marginal pieces 39 and 40, which cooperate in a similar way to make a multiple tube structure in which the tubes are modified rhomboid in cross section, as indicated at 41 in Fig. 16.

In such an instance, each core 38 may have a rhomboid base 42, a modified rhomboid head 43, a waist groove or passage 44, and feed grooves 45, as shown in Fig. 15. Such a structure will make a die operating substantially as described in connection with Figs. 1–12 and producing a multi-tubular or cellular structure with integral walls, as shown in Fig. 16.

The varieties illustrated are deemed sufficient, and they are not intended to indicate any limitation of the forms which the die and the product may take.

Making the cores and the marginal pieces with base portions that nest closely and register and hold the cores and associated parts firmly in their relations is preferred, because it makes the device so secure. Also it permits it to be taken apart and put together easily for repairs, for exchange, for cleaning, and servicing. The nesting may take a variety of forms, even to those illustrated by the cloves of garlic in a cluster.

However, the nesting is not indispensable, for the cores can be secured in place by keys, dowels, or soldering, etc., but to do so would be regarded as impairing the invention.

Similar remarks apply to the passaging through and about the cores.

I claim:

1. In a die for extruding thin, multiple tube structures with unitary walls, a group of cores of generally polygonal cross section, each including a relatively large base portion, a waist portion, and a reduced head portion, said base portion having a passage for fluent material leading to a distributing passage about the waist portion of the core which delivers fluent material to tubular, generally polygonal passages formed at least in part by the faces of said reduced head portions beyond the distributing passage, and marginal pieces having generally semi-polygonal faces mating the adjacent faces of the cores.

2. In a die for extruding multiple tube structures, a group of cores of generally polygonal cross section, each including a relatively large base portion, a waist portion and a relatively small head portion with a groove about the waist portion between the base and the head portions, marginal pieces framing the group of cores and having generally semi-polygonal recesses with base and head portions separated by grooves, all corresponding to the base and head portions of the cores and grooves between said core base and head portions, said head portions being separated from each other to define connected tube forming passages, said base portions having passages for fluent material leading to the groove about the waist portions of the cores and in the marginal pieces and serving to distribute the fluent material to the connected tube forming passages about the head portions of the cores.

3. In a die for extruding multiple tube structures, a screen plate having passages for fluent material to be extruded, a group of cores secured to the plate surrounded by marginal pieces forming a die opening, each core having a surrounding groove, said grooves being aligned transversely of the die, each core groove together with the surrounding grooves of other cores in the group making up a series of surrounding grooves connected throughout the group and adapted to contain and distribute a store of material to be extruded, said passages of said plate communicating with said surrounding grooves and each core having a head portion beyond the groove spaced from like head portions of adjacent cores in the group and otherwise complementary walls in an adjacent marginal piece a like distance, the spaces between the head portions in the group and between the head portion at the sides of the group and the adjacent marginal pieces being joined in continuous series throughout which fluent material may flow in continuous tube walls in a group interconnected throughout.

4. In a die for extruding multiple tube structures, a screen plate having passages for fluent material to be extruded, a group of cores secured to the plate surrounded by marginal portions forming a die opening, each core having a surrounding groove, said grooves being aligned transversely of the die, each groove together with the surrounding grooves of other cores in the group making up a series of surrounding grooves connected throughout the group and adapted to contain and distribute a store of material to be extruded, said passages of said plate communicating with said surrounding grooves and each core having a head portion beyond the groove spaced from like head portions of adjacent cores in the group and otherwise complementary walls in an adjacent marginal portion a like distance, each core and marginal portion including a base complemental to the adjacent bases throughout whereby when assembled the bases mutually register and locate the cores with surrounding and extruding passages continually joined and adapted to receive material simultaneously and in substantial uniformity to form continuous tube walls.

5. An extrusion die comprising a body portion having a plurality of equally spaced feed passages arranged to define a plurality of polygonal configurations each having the same number of sides and in which the sides and corners of each form sides and corners of adjacent configurations, said body portion also having a plurality of polygonal pooling passages coextensive with the configurations defined by said feed passages and defining like configurations in which the sides and corners of each configuration form sides and corners of adjacent configurations, said body portion additionally having a plurality of extrusion passages coextensive with said configurations defined by said feed passages and said pooling passages, said extrusion passages defining like configurations in which the sides and corners of each configuration form sides and corners of adjacent configurations, the volumes of said feed passages, pooling passages and extrusion passages being respectively uniform transversely of the die.

6. An extrusion die for extruding multiple tube structures with each tube being of polygonal configuration, said die comprising a body portion having a relatively large inlet passage for receiving fluent material, a screen portion extending transversely across the inlet passage, said screen portion including a rear facing upstream of said passage and a front face facing downstream of said passage, said screen portion being provided with a plurality of feed passages extending therethrough, a plurality of polygonally shaped cores affixed to the front face of the screen portion, each core having a base portion, a reduced waist portion and a head portion, the base portions of the cores being of interfitting polygonal configuration and mounted on the front face of the screen portion in abutting relation, the head portions of the cores being also of polygonal configuration and of such dimension as to provide extruding spaces therebetween to define the walls of the extruded product, said cores also being provided with feed passages at the peripheral margins of said base portions mating with and communicating with the feed passages in said screen portion, the reduced waist portions of the cores collectively being aligned transversely of said inlet passage and providing pooling passages for the fluent material, the spaces between the head portions of the cores collectively providing cross-sectional areas less than the cross-sectional area of the pooling passages.

7. An extrusion die for extruding multiple tube structures comprising a body portion including a relatively large inlet passage for receiving fluent material, a screen portion extending transversely across said inlet passage and being formed with a plurality of feed passages extending therethrough, said feed passages being arranged to define a plurality of polygonal configurations in which the sides and corners of each form sides and corners of adjacent configurations, said die further comprising a plurality of cores extending longitudinally of said passage downstream of the screen portion, said cores being equivalent in number to the number of the configurations defined by said feed passages, said cores being respectively aligned with the respective configurations, each of said cores having a polygonal configuration that corresponds with the feed passage configuration with which the core is aligned, said cores each including a projecting head portion and a waist portion upstream of said head portions, said waist portions being proportioned to define a plurality of polygonal pooling passages coextensive with said configurations defined by said feed passages and forming configurations in which the sides and corners of each configuration form sides and corners of adjacent configurations, said configurations of said pooling passages corresponding in configuration to the respective configurations of said feed passages, said head portions being proportioned to define a plurality of extrusion passages coextensive with said configurations formed by said pooling passages, said extrusion passages forming configurations in which the sides and corners of each configuration form sides and corners of adjacent configurations, said extrusion passage configurations corresponding respectively to the respective configurations of said pooling passages, said feed passages being respectively aligned with the respective extrusion passages longitudinally of said inlet passage, and terminating in ports opening into said pooling passages, said feed passages including said ports each being unidirectional throughout their lengths.

8. In a die for extruding multiple tube structures, a screen member having spaced feed passages for material to be extruded, a group of cores, each of said cores having a relatively large base portion, a relatively small head portion and an intermediate grooved portion separating said head and base portions, said base portions being in interfitting relation, each of said base portions being formed with a feed passage leading from a feed passage of said screen member to said grooved portion thereof, said head portions defining reduced end passages and said grooved portions leading to said reduced end passages, said reduced end passages comprising extrusion passages, and means for holding said cores together, said passages of said screen member and said base portions being unidirectional throughout their respective lengths, and being respectively unidirectionally aligned with the respective grooved portions longitudinally of the direction of fluent flow through said feed passages, whereby the fluent flow of the material being extruded is substantially unidirectional through said die into said grooved portions.

References Cited in the file of this patent

UNITED STATES PATENTS

| 1,152,978 | Royle | Sept. 7, 1915 |
| 1,228,495 | Tanzi | June 5, 1917 |
| 1,424,775 | Quast | Aug. 8, 1922 |
| 1,906,744 | Frandsen | May 2, 1933 |

(Other references on following page)

UNITED STATES PATENTS

| | | | |
|---|---|---|---|
| 2,364,005 | Simons | Nov. 28, | 1944 |
| 2,392,190 | Ritter | Jan. 1, | 1946 |
| 2,461,640 | Hallberg | Feb. 15, | 1949 |
| 2,477,852 | Bacon | Aug. 2, | 1949 |
| 2,514,886 | McDearmon | July 11, | 1950 |
| 2,572,677 | Tench | Oct. 23, | 1951 |
| 2,628,386 | Tornberg | Feb. 17, | 1953 |
| 2,654,686 | Hanson | Oct. 6, | 1953 |
| 2,696,640 | Wienard | Dec. 14, | 1954 |
| 2,709,834 | Johnson | June 7, | 1955 |
| 2,748,401 | Winstead | June 5, | 1956 |

FOREIGN PATENTS

| | | | |
|---|---|---|---|
| 761,481 | Germany | Nov. 8, | 1951 |